Dec. 6, 1938.  J. B. McMULLEN  2,139,598
COOKING UTENSIL
Original Filed Nov. 7, 1934
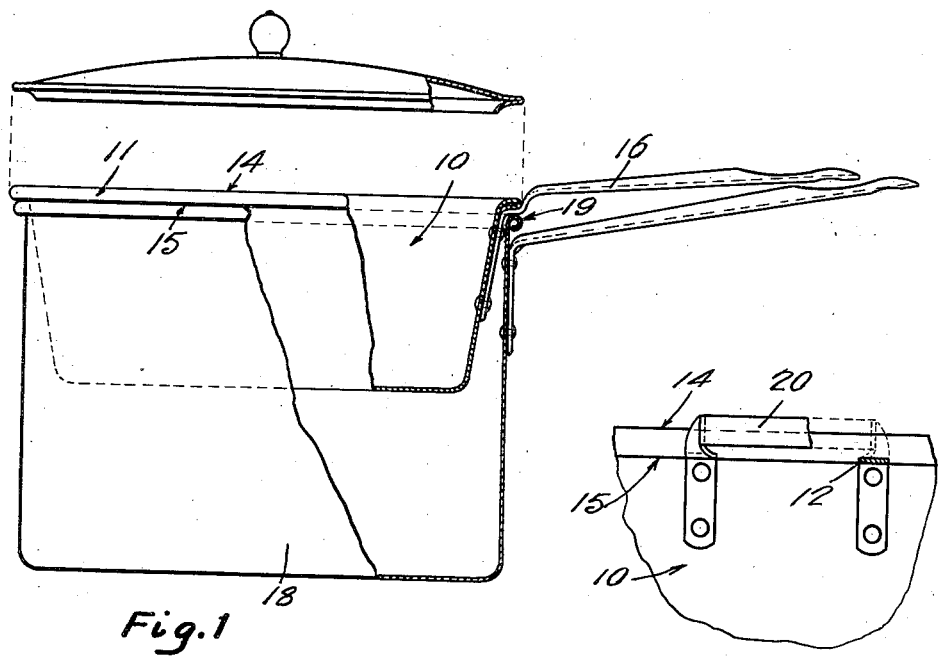
Fig. 1
Fig. 5
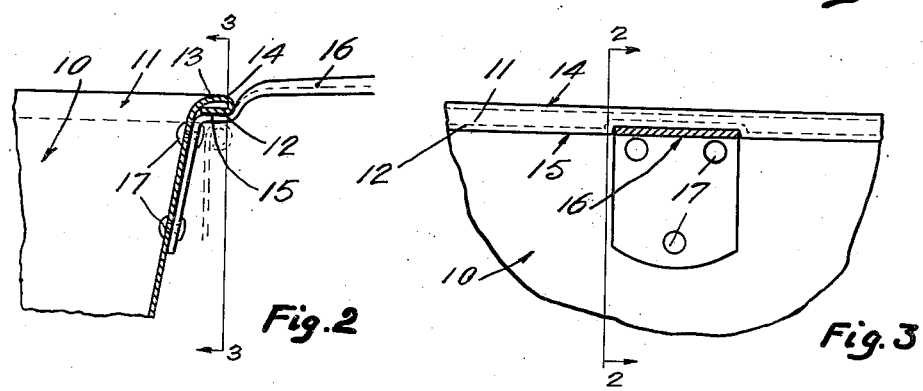
Fig. 2
Fig. 3
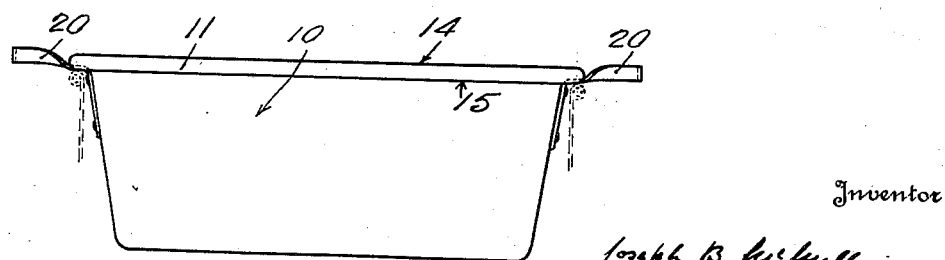
Fig. 4
Inventor
Joseph B. McMullen
By Albert D. [illegible]
Attorney Patented Dec. 6, 1938

2,139,598

UNITED STATES PATENT OFFICE 2,139,598

COOKING UTENSIL

Joseph B. McMullen, Washington, D. C.

Application November 7, 1934, Serial No. 751,923
Renewed May 11, 1938

4 Claims. (Cl. 53—8)

My invention relates to cooking utensils and more especially to that type of vessels or receptacles commonly known as sauce-pans, used individually, or in conjunction with other receptacles to form what is generally known as a double boiler.

The invention contemplates the formation of the utensil and the attachment of the handle thereto in such a way that maximum strength is imparted to the same without the use of an unnecessary amount of material.

The invention further contemplates the formation of a utensil in such a way that it will not accumulate during service an undue amount of food or residue around the top and in the vicinity of the handle, a fault commonly found in many types of utensils now on the market, thereby insuring ready and rapid cleansing of the vessel.

The invention also contemplates the formation of the upper portion of the utensil in such a way that when a lid or cover is applied thereto uniform and continuous sealing engagement will be obtained. The upper portion of the utensil is also arranged in such a way that when it is used with another receptacle to form a double boiler, a uniform and continuous contact will be had and a substantial sealing of the inner and outer containers obtained. The connection of the handles to the vessels are made in such a way as to insure this sealing arrangement.

With a continuous sealing between outer and inner receptacles, thereby substantially reducing the escape of heat or steam, food may be cooked more rapidly than in the common type of double-boiler; an even distribution of heat is obtained; the danger of excessive reduction of water level in the outer container is minimized; and a saving in fuel effected.

A detailed description of the invention will hereinafter be made with particular reference to the drawing in which:

Figure 1 is a side view partial in section, showing the invention utilized in connection with a double-boiler;

Figure 2 is a detailed view taken on the line 2—2 of Figure 3 looking in the direction of the arrows and illustrating the manner of affixing the handle to the utensil so as to permit a continuous sealing of outer and inner receptacles;

Figure 3 is a detailed view taken on line 3—3 of Figure 2 looking in the direction of the arrows;

Figure 4 illustrates the application of two handles to the container arranged in such a way as to permit continuous sealing contact between outer and inner receptacles;

Figure 5 is a detailed end view of one of the handles shown in Figure 4.

The invention as herein disclosed illustrates several forms of attaching the handle to the vessel in such a manner as to accomplish the objects herein set forth.

In the form shown in Figures 1 to 5, both inclusive, a sheet metal sauce-pan 10 is fashioned to the desired shape and the upper portion thereof is rolled or pressed outwardly, then downwardly and inwardly to form an outwardly extending top flange 11. Preferably the underportion 12 of the flange should be spaced from the upper portion 13 of the flange as suggested in Fig. 2. The upper and lower surfaces 14 and 15 respectively of the flange should occupy a parallel relation in order to provide for uniform seating and sealing as hereinafter explained.

A handle 16 is attached to the utensil in such a way as to provide for maximum strength and cleanliness of the utensil when in use and at the same time provide for continuous sealing of vessels when nested for use as a double boiler. To accomplish this the flange 11 has its under portion 12 recessed or pressed upwardly to an extent substantially equal to the width and thickness of the handle as shown in Figure 3. By this construction the undersurface of the handle 16 is caused to occupy a position parallel or flush with the lower surface 15 of the flange. This construction as clearly appears from Figure 3 serves to effect a substantially unbroken lower surface for the flange 11. The handle may be riveted as at 17 or otherwise suitably fastened to the utensil.

Figure 1 shows the utensil 10 arranged to form a part of a double boiler in which the outer receptacle 18 is formed with a rolled flange 19, the upper surface of which is formed so as to provide a seat or seal for the inner utensil 10. By forming the flange of the utensil 10 as above described, it will be seen that when the receptacle 10 is placed within the outer receptacle 18 a uniform seating and sealing will be obtained between the flanges of the outer and inner receptacles, the attachment of the handle to the inner receptacle, as above described, offering no obstacle to the uniform sealing.

Figures 4 and 5 illustrate a utensil provided with two handles 20 and these may be in the form of strap material as illustrated in Figure 5. When such a construction is used the under portion 12 of the flange 11 of the receptacle is recessed or pressed upwardly to a distance equal to the width and thickness of each leg of the handle. This construction like that of Fig. 3 provides for a continuous and substantially unbroken lower surface of the flange. The handle may be riveted or otherwise suitably attached to the utensil. This construction, like that shown in Figure 1, provides for a uniform and continuous seating and sealing of the utensil when used to form a double boiler.

From the foregoing description of the several details of the invention it will be observed that the invention contemplates the use of a utensil either as a single vessel or in conjunction with other vessels to form a double boiler. When utilized in connection with a double boiler arrangement contemplating the use of inner and outer receptacles they are so shaped and designed that the upper flanges are substantially of the same diameter. This arrangement permits an interchange of vessels of any given diameter and also provides for the use of a single lid for either vessel, the lid in any case providing a continuous seal or closure for the receptacle. In purchasing utensils on the open market it is therefore advantageous to purchase by diameter only since they are interchangeable.

What is claimed is:

1. A cooking utensil having bottom and side walls, a flange extending outwardly from the side wall provided with an upper surface extending in a single plane and a lower surface extending substantially parallel with the upper surface, a handle fixed to the utensil having a portion contiguous to the flange and extending laterally therefrom and lying within the plane of the upper and lower surfaces of said flange.

2. A cooking utensil having bottom and side walls, a flange extending outwardly from the side wall and provided with upper and lower portions, the former extending in a single plane, said lower portion of the flange being recessed to an extent sufficient to receive the contiguous end of a handle whereby to provide a contiguous and unbroken lower surface for the lower portion of the flange.

3. A cooking utensil having bottom and side walls, a flange extending outwardly from the side walls provided with upper and lower portions the former extending in a single plane and the lower portion extending in a plane substantially parallel with the upper portion, said lower portion being provided with a recess, a handle fixed to the utensil having a portion extending laterally from the utensil and occupying said recess to an extent sufficient to provide a continuation of the lower portion of the flange in the region of the recess.

4. A cooking utensil having bottom and side walls, a portion of the side wall being rolled outwardly and inwardly to provide a flange having upper and lower portions, the latter being provided with a recess, and a laterally extending handle having an attaching end set within said recess and to extend therefrom flush with the lower surface of the flange.

JOSEPH B. McMULLEN.